United States Patent [19]  
Tiribelli

[11] 4,330,688  
[45] May 18, 1982

[54] SYSTEM FOR STATISTICAL SUPERVISION OF TRUNK-DIALED LONG-DISTANCE TELEPHONE CALLS

[75] Inventor: Paolo Tiribelli, Turin, Italy

[73] Assignee: CSELT - Centro Studi e Laboratori Telecomunicazioni S.p.A., Turin, Italy

[21] Appl. No.: 115,034

[22] Filed: Jan. 24, 1980

Related U.S. Application Data

[63] Continuation-in-part of Ser. No. 916,355, Jun. 16, 1978, abandoned.

[30] Foreign Application Priority Data

Jun. 21, 1977 [IT]  Italy ............................... 68436 A/77

[51] Int. Cl.³ ............................................. H04M 3/36
[52] U.S. Cl. .................................. 179/8 A; 179/7 R; 179/175.2 R
[58] Field of Search ................... 179/8 A, 8 R, 9, 7 R, 179/7.1 R, 175.2R; 370/62

[56] References Cited

U.S. PATENT DOCUMENTS

| | | | |
|---|---|---|---|
| 3,868,480 | 2/1975 | Murzio et al. ...................... | 179/8 A |
| 3,959,593 | 5/1976 | Muhta ................................ | 179/8 A |
| 4,022,978 | 5/1977 | Connell et al. .................... | 179/8 A |
| 4,048,450 | 9/1977 | Bernard et al. ................... | 179/9 |
| 4,066,843 | 1/1978 | Waks et al. ....................... | 179/8 A |
| 4,085,293 | 4/1978 | Karras ................................ | 179/8 A |
| 4,156,109 | 5/1979 | Kraushaar et al. ............... | 179/8 A |
| 4,165,447 | 8/1979 | Bertozlio et al. ................. | 179/8 A |

Primary Examiner—Gerald L. Brigance  
Attorney, Agent, or Firm—Karl F. Ross

[57] ABSTRACT

To facilitate the supervision of directly dialed long-distance telephone traffic, output signals from call monitors ($G_1$–$G_n$) associated with a number of trunk lines are fed to a plurality of multisensor signal detectors (SD) of an associated exchange working into a data-input unit (ID) which includes a serializer (MS) assembling signal samples from all the sensors into a comprehensive frame. The frame serializer comprises a number of multiplexers (M1–M16) which, in the course of a scanning cycle consisting of 16 subcycles, feed respective output frames from the several detectors during each subcycle to corresponding cells of a shift register (SR). Each output frame contains bits from an associated set of sensors that are sequentially read out during the subcycle in which they are loaded into the shift register. If a given set of sensors is to be scanned at the maximum rate, i.e. 16 times per cycle in this instance, the corresponding multiplexer is not switched between subcycles; otherwise, i.e. for a scanning rate subharmonically related to the maximum rate, the multiplexer assumes two, four, eight, or sixteen different positions during a cycle under the control of an instruction memory (CC) which is addressed by a time base (BT) to read out the applicable switching cadence. The bits issuing from the shift register are fed to a processing unit (UE) including a preprocessor (IP) and a microprocessor (EL) provided with a common data memory (ME).

10 Claims, 8 Drawing Figures

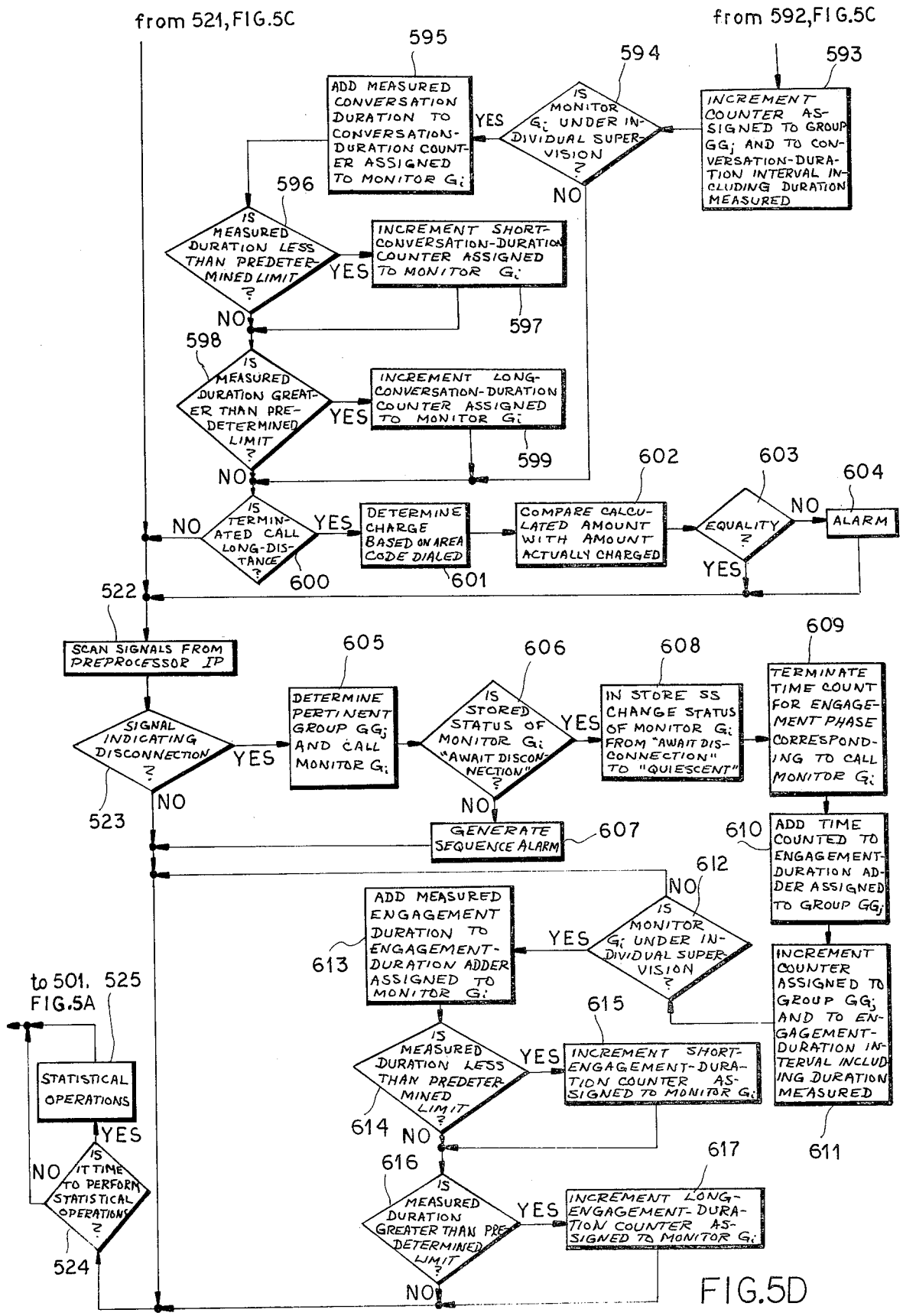

SYSTEM FOR STATISTICAL SUPERVISION OF TRUNK-DIALED LONG-DISTANCE TELEPHONE CALLS

CROSS-REFERENCE TO A RELATED APPLICATION

The present application is a continuation-in-part of my copending application Ser. No. 916,355, filed June 16, 1978 and now abandoned.

FIELD OF THE INVENTION

My present invention relates to telephone-traffic-measuring apparatus and more particularly to an electronic system for statistically monitoring direct-dialing long-distance telephone communications.

BACKGROUND OF THE INVENTION

It is known that in trunk exchanges every call monitor generating signals for periodic counting (such as conventional duration and area counters or emitters of metering pulses) is associated with so-called statistical counters which, on the basis of the circuit conditions characterizing the different stages of a call, totalize the number of engagements, the number of effective calls, the duration of each call and the number of counting pulses for the traffic associated with a given call monitor.

The reading of data from statistical counters allows to obtain direct information on the traffic associated with the respective call monitors, e.g. information concerning the average traffic during certain time intervals, the traffic allotted to various parts of the exchange, or the origin of the traffic. In addition, such data can give indirect information on service quality (e.g. the number of successful calls), and on the correctness of operation of the call monitors to which the counters are connected.

Moreover, statistical counters can provide data necessary for profit sharing, as needed when several companies combine to provide telephone service within a given country.

At present such data are obtained by periodically photographing the counters and by transcribing data in a form and on a carrier which can be read by a processor arranged to derive from these data the information necessary for the administration of the service.

This method of operation presents many serious disadvantages.

It is very expensive, since it requires a lot of labor for data collection, photograph development, and data transfer in a form and onto a carrier suitable for reading by the processor.

For this reason, the data collection is normally carried out only at rather long intervals (e.g. monthly) and, as a consequence of the length of time needed for a data-collection operation, the available information is very seldom up to date.

A further consequence is that failures of the counters or of the call monitors to which they are connected are discovered only after considerable delays.

Moreover, such data-collecting techniques provide results which are not sufficiently reliable, both because of the intrinsic nature of electromechanical counters, which are highly susceptible to wear, and because of the large number of processing operations required which tends to increase the error probability.

For this reason, after a data-collection operation, if the data obtained are sufficiently different from a predetermined allowable range of values considered as indicating probable correct operation of the call monitors associated with the exchange, it is necessary to carry out a series of checks in order to establish whether the discrepancy is due to real operating anomalies of the call monitors or to inadequate data collection. It is evident that the need for such checks not only increases the intervals at which such data are made available but also raises the total cost of the data-collection operations.

Another disadvantage of the present way of reading data from statistical counters is that, as such counters are all located near the associated trunk exchanges, it is practically impossible to obtain simultaneously data relating to the entire country.

In commonly owned copending application Ser. No. 833,363, filed by me jointly with two others on Sept. 14, 1977, now U.S. Pat. No. 4,165,447, there has been disclosed an apparatus designed to automatize these operations, i.e. to obtain data relating to traffic directly from call monitors energizing mechanical statistical counters and to preprocess such data relating to traffic so as to make them directly utilizable by the processor.

To this end, the apparatus described in that prior patent includes a synchronous preprocessor (having an operating cycle in which respective time slots are allotted to sensors to be supervised) designed to measure the duration and count the number of events associated with the state of each monitored signal path and to emit, in message form, significant data relating to each call monitor. This task is accomplished by the use of sophisticated preprocessor equipment arranged to handle, without loss, data from a multiplicity of sensors. Such an apparatus is well adapted to the characteristics of available processing systems; the unit cost of the processing operations is reduced to a minimum, and the sensors serving to detect the states of the monitored signal paths can be scanned in a time-multiplexing mode to report the signals present at their inputs. Thus, such sensors could be easily located far from the preprocessor since the connections require but a small number of wires; besides, the communications between sensors and preprocessor are of a limited nature so that each information can be detected by its time location, hence the structure of the data-collecting devices can be rather simple.

OBJECT OF THE INVENTION

The object of my present invention is to provide an improved system of the general type described in U.S. Pat. No. 4,165,447 which has greater flexibility in the sampling of a large number of sensors, especially as concerns their scanning rate, and affords quick access to the data obtained therefrom.

SUMMARY OF THE INVENTION

In accordance with my present invention, a plurality of signal detectors each include a multiplicity of sensors which form groups receiving output signals from associated call monitors, a predetermined number of bits derived from samples of these output signals being sequentially combined in an individual output frame emitted by each signal detector. A data-input unit includes a frame serializer which receives these individual output frames from the several signal detectors and synthesizes therefrom a comprehensive frame with a constant number of time slots accommodating a multiple of the number of output-frame bits, this unit further including timing means for establishing a recurrent scanning cycle divided into several subcycles. The frame serializer comprises switching means controlled by the timing means for selecting different combinations of output frames for assembly in that comprehensive frame during different subcycles; certain of these output frames, derived from circuits which are in need of more frequent sampling, are included in a plurality of subcycles recurring periodically within a scanning cycle, e.g. in each subcycle or in every other one. The comprehensive frame is transmitted to processing means, advantageously including a preprocessor and a microprocessor, in each scanning cycle for an evaluation of the bits contained in respective time slots of that frame.

Pursuant to a more particular feature of my invention, the switching means of the data-input unit comprises a group of multiplexers with plural inputs connected to the several signal detectors and with single outputs connected to respective cells or stages of a shift register which is stepped by the timing means a sufficient number of times during each subcycle to read out, in the aforementioned time slots, all the signals contained in the output frames simultaneously fed in by way of these multiplexers. Each multiplexer occupies a given position during a whole number of subcycles according to the selected scanning rate or cadence which, preferably, is a whole number times the recurrence rate of the scanning cycle. In a limiting case, in which that cadence is a maximum equal to the recurrence rate multiplied by the number of subcycles, a particular multiplexer retains its position throughout the cycle; with a minimum cadence of one sample per cycle, on the other hand, the multiplexer stands on a given input only during a single subcycle.

The positions of the multiplexers during each subcycle may be read out from an instruction memory addressable by the timing means. I also prefer to provide, in addition, a store of selection codes loadable by the processing means connectable in lieu of that memory to the switching inputs of the multiplexers for the sampling of a chosen set of sensors. It is also advantageous to insert between the multiplexer outputs and the shift-register cells a further multiplexer for connecting these cells to a source of test signals during certain time slots.

A real-time processing system using a microprocessor has less processing capacity than a system including a synchronous high-capacity preprocessor and a minicomputer. Yet the decrease in the number of call monitors which may be served by a single processor may be compensated by the advantages deriving from the use of units of lower processing capacity but higher flexibility.

In the first place, the use of processing operations in real time may be advantageous also for small exchanges, as unit cost for each point of the processing system is low also for a limited number of call monitors served by the processor; in this way, too, statistical data relating to these exchanges are available at any time.

Furthermore, the employment of microprocessors allows the use of preprocessors which are easily controlled by the program of the main processor and which utilize for their operations the memory of the microprocessor.

In this way the entire information which in the aforedescribed system is split between preprocessor and processor could be easily collected in a single logic unit (the microprocessor).

This allows either more sophisticated processing operations of the same data in order to obtain new information, or simpler processing operations to obtain the same results, and it even gives access to data which are not obtainable in a system in which information is separated.

More particularly, traffic measurements by straight sampling (i.e. measurements whereby data are extracted during a certain period from a first set of call monitors, during a subsequent period from another set, etc.) need no longer be carried out in space division, by physically establishing each time the connection between call monitors to be explored and the utilization equipment, but can be performed in time division; all the call monitors can thus be permanently connected to the apparatus, but only a small part of them are chosen at any time by the processor to provide measurement information. In this way, also those exchanges which are relevant for the supervision of traffic but are too big to be controlled by conventional apparatus and too small to employ a system based on a minicomputer, for instance, may advantageously use logic networks having recorded programs operating in real time.

BRIEF DESCRIPTION OF THE DRAWING

These and other features of my present invention will become clearer from the following description of a preferred embodiment thereof, given by way of example and not in a limiting sense, taken in connection with the annexed drawing in which:

FIGS. 5A-5D, together, constitute a flow-chart diagram representing operations of the microprocessor shown in FIGS. 1 and 4.

SPECIFIC DESCRIPTION

Figure 1:
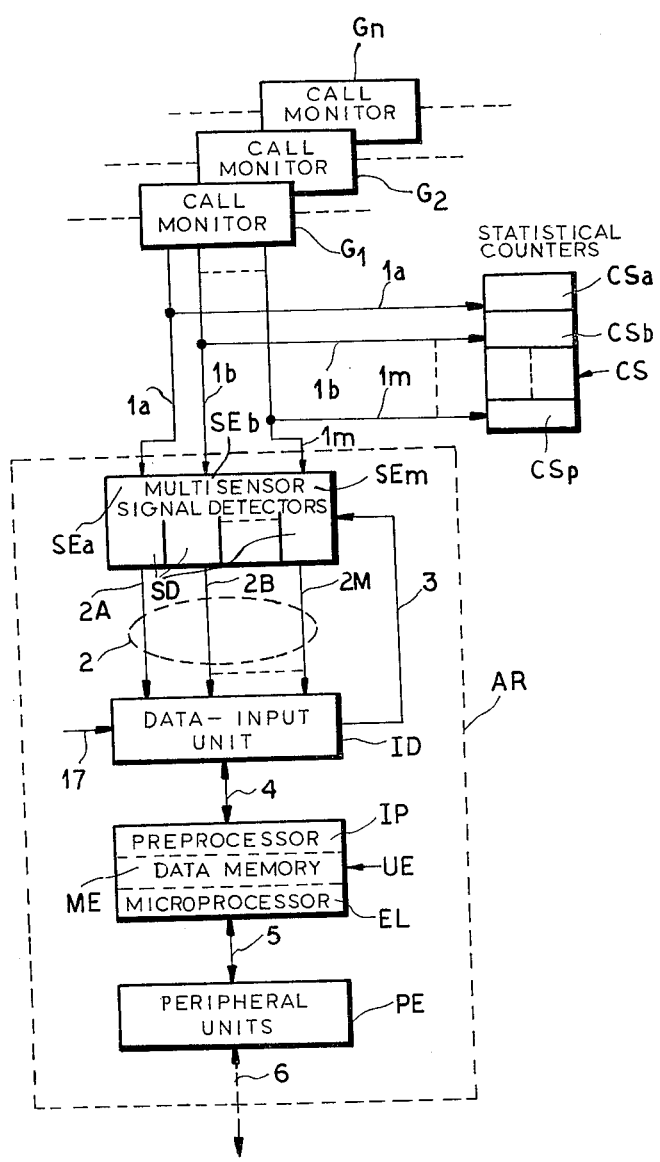
FIG. 1 is a block diagram of a system according to my invention.

FIG. 1 shows at $G_1$, $G_2$, ... $G_n$ a multiplicity of components designed to generate periodic counting pulses for the timing of trunk-dialed calls and will be hereinafter referred to as call monitors, in conformity with the designation used in U.S. Pat. No. 4,165,447.

A plurality of connections $1a$, $1b$, ... $1m$ respectively convey incoming signals characterizing the stages of a trunk-call connection, i.e. engagement of busy condition, dialing, call or response and metering pulses. Each monitor $G_1$-$G_n$ is connected to a plurality of statistical counters $CSa$, $CSb$, ... $CSp$ of a supervisory post CS which totalize the number of engagements, the durations of the engagements, the number of calls, the durations of the calls and the number of metering pulses and which analyze dialing digits for the traffic associated with the call monitors to which the counters are connected.

The number m of incoming connections will generally be greater than the number of the examined circuit conditions since it may be necessary to split up the traffic associated with each call monitor, e.g. to distinguish either the subscriber's traffic from operator's traffic or the local traffic from long-distance traffic, or to share credits among a plurality of companies providing the service. In this case the same incoming signal may be present at any instant on a plurality of different wires 1a–1m and, consequently, may be supplied to a plurality of different counters of post CS. Moreover, the number p of these counters will generally be greater than the number m of wires, as for some circuit conditions a duration counter may be additionally provided.

To simplify the drawing, I have shown in FIG. 1 only those connections and counters that are associated with call monitor $G_1$.

A plurality of signal detectors SD, each comprising one or more identical groups of sensors SEe, SEb, . . . SEm depending on the number of call monitors from which signals are to be received, cyclically explore the respective connections 1a, 1b, . . . 1m associated with each of the call monitors $G_1$–$G_n$ in order to detect the incoming signals present on these connections and to emit, on respective connections 2A, 2B, . . . 2M of a line multiple 2 and in a suitable time sequence, serialized samples of these incoming signals (i.e. logic levels corresponding to the presence or absence of current on the several groups of wires 1a, 1b, . . . 1m) in sequence for all the call monitors. Besides these samples, detectors SD provide also, at suitable instants, signals which may be utilized for checking purposes. The serialized samples constitute individual output frames of the respective signal detectors.

The serialized emissions of samples, owing to which a single wire is sufficient to transfer the samples to utilization equipment, enable the location of the signal detectors to be independent of the location of such equipment which may therefore be placed elsewhere without making it necessary to extend a very large number of wires from the detectors to the point of utilization.

Signal detectors SD, may be of any known type; it is only necessary that they can be connected to call monitors $G_1$–$G_n$ without requiring any modification of the structure of these call monitors and their connection to the statistical counters at post CS, and that possible failures and maintenance operations do not cause operating anomalies in the exchange.

These signal detectors may be of the kind in which magnetic cores having rectangular hysteresis loops are used as sensors, each core having a writing winding associated with the circuit carrying the current to be detected.

The groups of sensors forming part of the signal detectors SD also include sensors which are not associated with any call monitor and are arranged to check the operation of the detector while leaving free time slots in their output frames for purposes which will be described hereinafter.

The signal reception and the emission of samples by detectors SD in the form of respective output frames are controlled by timers (not shown in the drawing) associated with the individual detectors or with groups of them.

The operations of the detectors are synchronized with those of the subsequent circuit elements by means of a downstream data-input unit ID, which will be described later. A connection 3 extends for this purpose from unit ID to the signal detectors SD.

In general, different signals must be transmitted by respective sets of sensors to subsequent circuit elements with different recurrence rates according to the nature of the circuit parameters and/or data which may be detected.

To simplify the structure of the apparatus it is advisable to have longer exploration times or scanning periods which are all multiples, preferably according to powers of two, of the minimum scanning period. That may be achieved if the sets of sensors, irrespective of their actual physical distribution, are so connected to the downstream data-input unit ID as to simulate their insertion into an imaginary matrix whose rows, for instance, are scanned during a time corresponding to that minimum period; the entire matrix will then be explored in a time equal to the maximum scanning period. All the sets of sensors will be actually connected to call monitors $G_1$–$G_n$ if the apparatus is fully equipped; if this is not the case, some positions in the different rows will correspond to sets of sensors not connected to any call monitor and this will be taken into account in the downstream circuitry as will be described hereinafter.

The number of sets for each row of the imaginary matrix and the number of rows are linked to the ratios between the different scanning periods and to the maximum capacity of the system. Generally speaking, each row of this imaginary matrix will comprise all the sets to be scanned at the maximum recurrence rate, half the sets to be scanned at half the maximum rate, one fourth of the sets to be scanned at a quarter of the maximum rate, and so on.

Contrary to this rule, and if the aims of the processing operation allow it (i.e. if from one or more circuit parameters only statistical information is to be derived), it is possible that the sets of sensors corresponding to these parameters may be scanned in a straight sampling mode of the kind discussed in the introductory part of the present disclosure, that is to say that in a certain row or group of rows of the matrix, on the columns corresponding to the sets of sensors detecting such parameters for a certain group of call monitors, the scanning of the group of sensors associated with a preceding row or rows need not be repeated but sets of sensors connected to a different group of call monitors may be scanned instead. Obviously, each group may supply data for a time sufficient to make them significant. More particularly, straight sampling may be used for parameters corresponding to dialing pulses which, because of their nature, require a higher rate of exploration.

Hereinafter, the time necessary to allow all the call monitors working into an assembly of sensors to supply data at least once to the subsequent circuit elements will be referred to as a "cycle" (i.e. the time necessary to read the entire imaginary matrix); "subcycle" I shall denote the time required to read a matrix row. The duration of a cycle and the duration of a subcycle will respectively correspond to the maximum and to the minimum parameter-exploring period.

By way of example, the imaginary matrix will be hereinafter supposed to consist of 16 rows and 16 columns; in this way the maximum theoretical capacity of the system (neglecting the existence of groups of sets of sensors to be scanned by straight sampling) may vary from 16 sets to be explored at the maximum rate to 256 sets to be explored at the minimum rate. The system may present all the intermediate configurations, provided the rows of the imaginary matrix have the above-mentioned structure. Possible further conditions may be imposed by the type of processing, as will be seen hereinafter.

To determine a correct time reference, it will be supposed that the shortest possible exploration period (duration of a subcycle) is of the order of 8 ms, so that the duration of the cycle is 128 ms; the sets may each comprise for instance 128 sensors (not necessarily connected to call monitors) corresponding to a 128-bit output frame delivered by the respective signal detector. If the matrix reading is performed so that on output multiple 2 all the bits emitted by sensors having the same location inside the various sets of a row of the imaginary matrix are present simultaneously, the information bit relating to a certain sensor is present on the corresponding wire of multiple 2 for about 64 μs.

Data-input unit ID receives from detectors SD, on respective wire links 2A-2M, their individual output frames composed of a succession of bits which represent the samples issuing from the various sets of sensors, along with signals of different nature (hereinafter referred to as "asynchronous signals") not correlated to the monitored parameters and coming, through a connection 17, from exchange components other than call monitors $G_1-G_n$; unit ID emits on an output connection 4 a comprehensive sample frame. The asynchronous signals, which may for instance be indications of the current tariff period, clock signals, or requests for visualizing collected data, will be inserted in the frame in the free time slots previously mentioned.

Unit ID must also check the correctness of operation of the signal detectors SD and of their timers, as well as the correctness of data transmission and of signal transfer to and from these detectors, and must further provide an alarm signal as soon as an anomaly is recognized.

These alarm signals are inserted in the general frame in a number of the aforementioned free time slots, provided for this purpose in the planning of the system.

The structure of unit ID and its mode of operation will be described in greater detail with reference to FIG. 2.

Reference UE denotes a unit designed to process the information present on connection 4.

Figure 4:
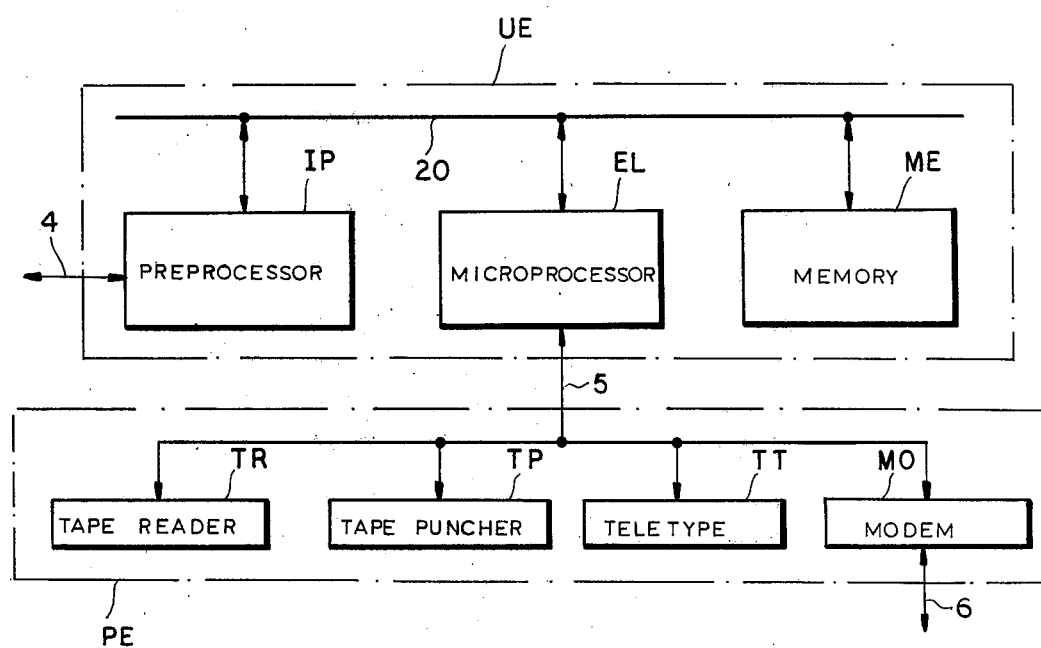
FIG. 4 is a block diagram showing in detail interconnections among a preprocessor, a data memory, a microprocessor and peripheral units illustrated in FIG. 1.

As illustrated in FIG. 4, unit UE comprises a preprocessor IP communicating via a bidirectional signal path or bus 20 with a microprocessor EL whose data memory ME includes some zones to which preprocessor IP may also have access. Subunits IP, ME and EL are schematically represented in FIG. 1 by sections of block UE.

Preprocessor IP acts as an interface between the synchronous part of the apparatus, comprising signal detectors SD and data-input unit ID, and its asynchronous part comprising microprocessor EL; it has the task of recognizing status changes in call monitors $G_1-G_n$ and possibly to carry out time counting and checks, e.g. duration counts. As a consequence of such operations, preprocessor IP sends to microprocessor EL messages indicating that a status change has occurred, and possibly messages of elapsed time or clock messages.

For its operations, preprocessor IP utilizes the common zones of memory ME. To simplify the drawing, connections between the various elements of unit UE are not shown.

Two embodiments of preprocessor IP have been described in commonly owned applications Ser. No. 886,526, filed Mar. 14, 1979 by Michele Castriotta et al, now U.S. Pat. No. 4,220,824, and Ser. No. 891,194, filed Mar. 29, 1978 by Valerio Barcaroli et al, now abandoned and replaced by CIP application Ser. No. 107,659 filed Dec. 27, 1979. The patent describes a wired-logic preprocessor which digitally integrates the received samples in order to recognize true status changes and has access to memory ME without engaging the bus of the microprocessor. The two last-mentioned applications describe a processing unit with a programmed-logic preprocessor including a fast microprocessor designed to carry out metering and supervisory operations; the preprocessor has access to the common memory according to a technique termed "cycle stealing". To simplify the description, and by way of example, it will be supposed that in the present system a processing unit of the type described in application Ser. No. 107,659 is arranged to process simultaneously two samples coming from a pair of sensors requiring equal scanning periodicity. This arrangement, which, as explained in the last-mentioned patent application, allows a better utilization of the memory of microprocessor EL, obviously requires that in the imaginary matrix the sets of sensors to be explored at the same rate are of even number.

As to microprocessor EL, it is basically arranged to process the information it receives from preprocessor IP relating to significant transitions (status changes) signaled by individual call monitors and to time supervisory operations, and to obtain from this information data which may be utilized for statistical purposes, for traffic measurements and for supervisory operations of the exchange. To carry out these operations, microprocessor EL may utilize suitable zones of memory ME, acting as a counter, in which it will totalize the number and durations of engagements and calls and the number of metering pulses subdivided into various classes (e.g. for every call monitor or group of call monitors, for called location, or for rate classes).

The tasks and processing operations carried out by microprocessor EL will be described in detail hereinafter. Until EL may advantageously take the form of an Intel 8080A microprocessor.

At PE I have generically indicated the peripheral units associated with the microprocessor EL which have the task of loading programs into same, of allowing man-machine communication, and of enabling information transfer to a remote center equipped with a higher-ranking processor. The connections between peripheral units PE and processing unit UE is schematically indicated at 5.

As shown in FIG. 4, block PE may, for instance, comprise a tape reader TR for loading data and programs into microprocessor EL, a tape puncher TP for recording processed data, a teletypewriter TT for man-machine communication and for alarm signaling in real time, and a modem MD sending data to the remote center via a connection 6. Peripheral units PE are conventional and, therefore, require no further description.

The ensemble of signal detectors SD, data-input unit ID, processing unit UE and peripheral units PE, constituting the electronic system embodying my present invention, has been designated AR.

Figure 2:
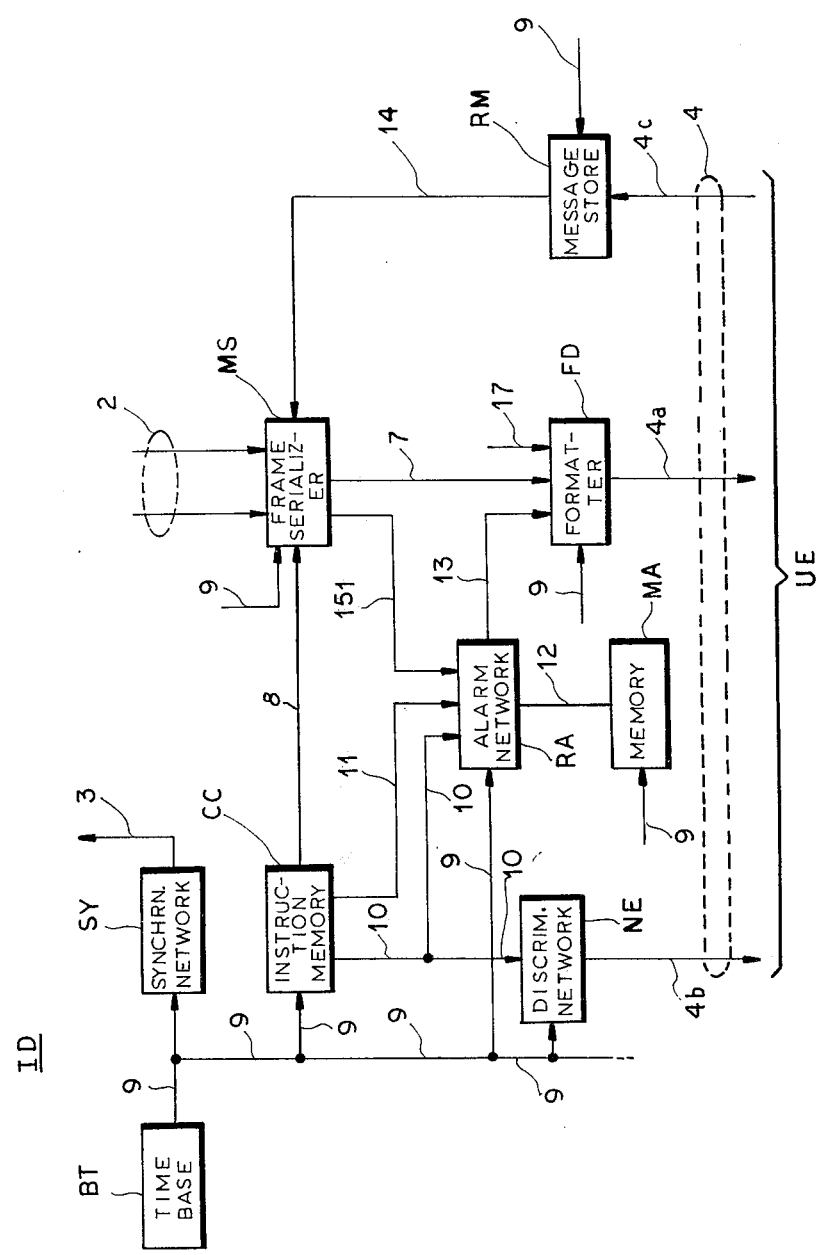
FIG. 2 is a block diagram of a data-input unit shown in FIG. 1.

As shown in FIG. 2, unit ID includes an assembly MS of multiplexers designed to serialize frames of samples and signals delivered by individual sets of sensors (i.e. to synthesize one comprehensive frame for every scanning cycle of the imaginary matrix) and to check such serialization.

The mode of operation of frame serializer MS, more fully described hereinafter with reference to FIG. 3, depends on the type of preprocessing interface IP used. If the latter is of the type described in U.S. Pat. No. 4,220,824 and can process two samples at the same time, assembly MS must deliver during every subcycle (every 128 ms in the example considered) on its output connection 7 a frame of pairs of samples following one another at a cadence of one pair every 8 μs.

Reference CC denotes a logic network which, in every subcycle, feeds to assembly MS, through a connection 8, information on the signal pattern emitted in this subcycle by the entirety of detectors SE*a*—SE*m* incorporating the sets of sensors from which assembly MS extracts the samples; in addition, network CC presents on a connection 10 information relating to the actual presence or absence of the scanned set and sensor, and on a connection 11 information relating to the actual physical location of the scanned set.

This information will be utilized by further logic networks RA and NE, whose functions will be described in detail below.

Network CC may consist for instance of an instruction memory of the read-only type (more particularly of the erasable programmable kind known as EPROM, e.g. Intel's model 1072A, in order to allow an easy adaptation to variation of the configurations of the intallation) containing as many locations (or words) as there are sensors forming the imaginary matrix. Through a connection 9, memory CC is addressed by a time base BT which controls the operations of all data-input units ID. Address words comprise a first group of bits which recognizes the sequence of subcycles (imaginary-matrix rows) and a second group which recognizes the sequence of sets of sensors inside the subcycles (imaginary-matrix columns).

In order to fulfill the tasks of network CC, each memory word comprises:
 a first group of bits, utilized for controlling the components of frame serializer MS, as will be described hereinafter with reference to FIG. 3, such bits being transferred to assembly MS via connection 8;
 one bit specifying whether the sensor currently examined is actually present, i.e. is connected to a call monitor, such a bit being sent to networks RA and NE via wire 10;
 a further group of bits which supplies the physical location of the call monitors and which is transferred to network RA via connection 11.

Instead of a read-only memory, network CC may also be constituted by a read-and-write memory (RAM) which may be directly loaded and updated by the processor. The internal organization of the memory and the contents of the words may be identical in both cases.

Logic network RA signals possible operating anomalies in the sensors included in the array of signal detectors SD (FIG. 1) and checks the status of the connections between these detectors and memory ME (FIG. 2).

For this purpose, network RA receives, by way of a connection 151, bits constituting the frame generated by serializer MS and, during time slots allotted to checking operations relating to each of the sets of sensors, tests the correctness of bit configurations present in these time slots. When an anomalous condition is discovered in several successive cycles or subcycles, or is otherwise found to recur in a predetermined number of subcycles or cycles, network RA generates an alarm signal on a connection 13. Network RA is linked via a connection 12 to a read-and-write memory MA in which, for each set of sensors, indications of anomalous operations are added up till they reach a predetermined threshold.

Operations of components RA and MA are synchronized by time base BT.

The alarm signal, containing information indicative of the kind of malfunction and of the physical location of the set of sensors from which such malfunction has originated (this location being supplied by memory CC via connection 11), is sent, always at instants chosen among those allotted to checking operations, to a further logic network FD, which will be described later, and thence to processing unit UE.

Such alarm disables in unit UE the processing of the parameter detected by the corresponding set of sensors in all the call monitors connected to that set; if required by the type of failure, the processing of other parameters supplied by the same call monitors will also be inhibited.

The emission of a failure signal by network RA is enabled only if the bit present on connection 10 indicates that the affected call monitor is actually present; by this means, useless operations are avoided in the processing unit.

Logic network FD, which may be referred to as a formatter, has the task of sending to processing unit UE via a link *ua*, forming part of connection 4, a frame of words consisting of a pair of bits indicating the state of a pair of signal detectors (bits supplied by serializer MS via connection 7) as well as the address of such detectors (bits supplied by time base BT); during certain time slots allotted to the processing of sensors definitely not connected to any call monitor as established in designing the system, formatter FD replaces, in the output frame, state samples and their respective address with possible alarm signals, supplied by network RA via conection 13, or with asynchronous signals.

Discriminating network NE receives from memory CC information relating to the physical presence or absence of the various sets of sensors, and from time base BT information relating to their state at that instant of the synchronous frame. Network NE generates on a link 4*b*, extending to unit UE as part of connection 4, a signal indicating whether the examined set of sensors (or pair of sets) is actually present; in the affirmative, that signal also indicates whether the examined sensor is connected to call monitors or is one of the fictitious sensors corresponding to time slots reserved for checking and alarm signals in each set of sensors. The lack of an affirmative signal disables the processing of data coming from those sets and/or sensors.

Reference RM denotes a logic network arranged to recognize and store messages, arriving from the processing unit UE over a link 4*c* included in connection 4, controlling the switchover between sets of sensors to be explored by straight sampling; such messages, duly coded, are transferred to serializer MS via a connection 14 for controlling the establishment of output connections from selected signal detectors as will be described hereinafter.

Finally, a logic network SY serves to synchronize the operations of the timers controlling the signal detectors SD (FIG. 1) with the operation of time base BT (FIG. 2). For this purpose, network SY receives time signals from component BT, decodes them, and generates suitable synchronism words which are sent to the signal detectors through connection 3; in addition, network SY checks the correct generation of such words.

The structure of logic networks such as components RA, FD, NE, RM, SY will not be described in detail inasmuch as, once the operations they carry out are described, their realization presents no difficulty to persons skilled in the art.

Figure 3:
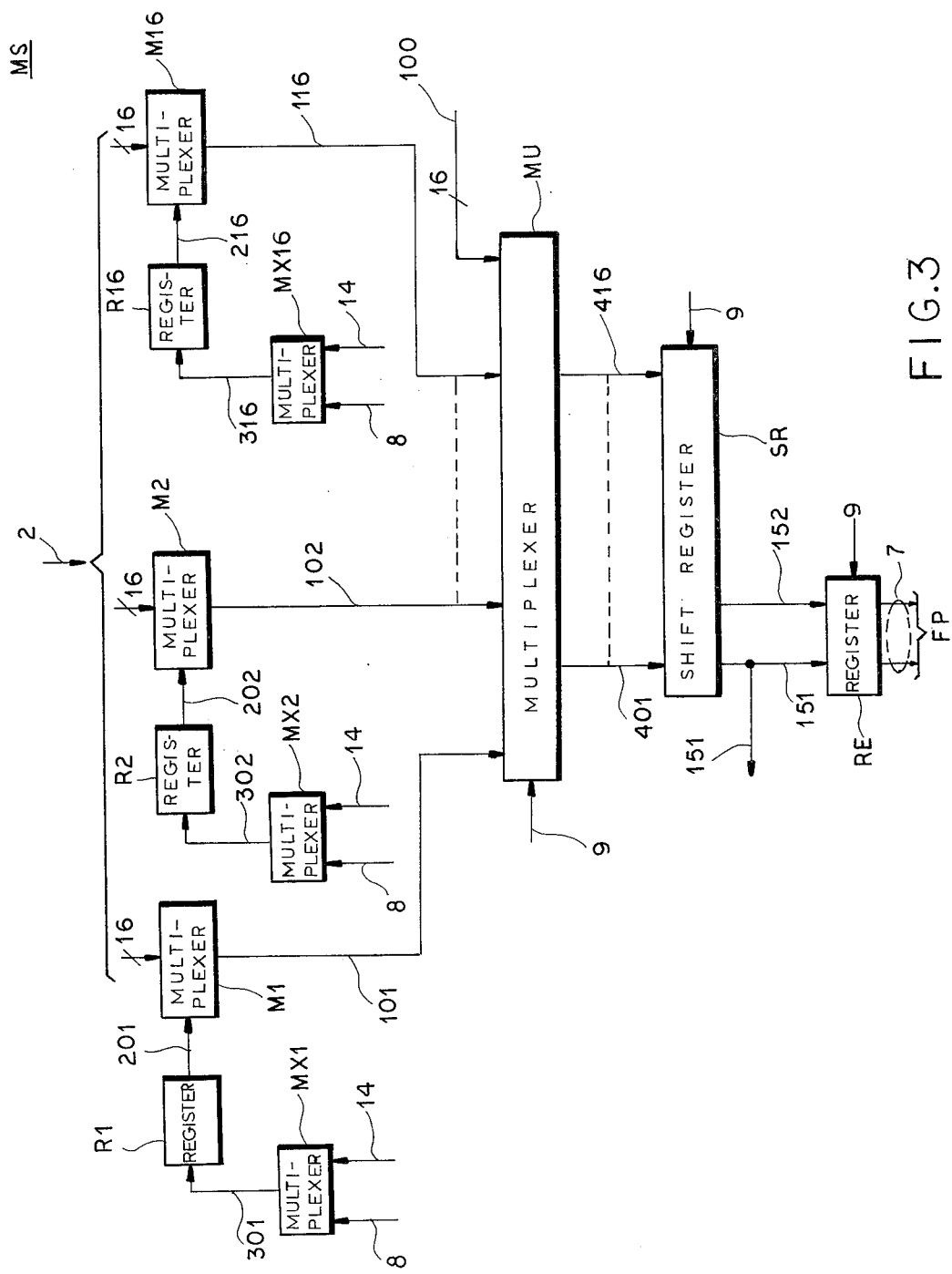
FIG. 3 is a schematic representation of a frame serializer forming part of the unit shown in FIG. 2.

As shown in FIG. 3, frame serializer MS includes 16 multiplexers M1, M2, ... M16 each having 16 inputs and one output, each of them being associated with a column of the imaginary matrix of the sets of sensors.

By way of the respective wires of connections 2A .. . 2M (FIG. 1), forming part of multiple 2, the inputs of multiplexers M1 ... M16 are each connected to one of the sets of sensors of the respective column whereby each of them receives the 128-bit output frame of the respective set; a chosen input of each multiplexer remains connected to the output 101, 102, ... 116 thereof for the entire duration of a respective subcycle (8 ms) as its bits are sequentially read out.

For each multiplexer M1–M16 the selection of the input to be connected to its output is controlled by the output signal of a register R1, R2, ... R16, respectively.

Each register R1–R16 maintains on a respective output 201, 202, ... 216, for the duration of a subcycle, the signal present on its switching input 301, 302, ... 316; such signal consists either of bits coming from instruction memory CC (FIG. 2) via connection 8 or, if the respective multiplexer M1 ... M16 (FIG. 3) is connected to a group of sensors to be explored by straight sampling, of bits arriving over connection 15 from logic network RM (FIG. 2).

A set of ancillary multiplexers MX1, MX2, ... MX16, which may be manually controlled, allows the transfer of either group of bits to switching inputs 301–316.

By the described arrangement, in light of the assumed structure of the imaginary matrix, multiplexers M1–M16 corresponding to the sets to be examined with maximum frequency will be always positioned on one and the same input during a cycle; multiplexers corresponding to a cadence of half the highest exploration rate will return to the same input in alternate subcycles, and so on. The exception to this rule are the multiplexers connected to the sets of sensors which are to be explored by straight sampling.

Reference MU denotes a further multiplexer having 32 inputs and 16 outputs; sixteen of these inputs are connected to outputs 101–116 of multiplexers M1–M16, the other sixteen being connected to sixteen wires of a multiple 100. Switchover circuit MU is normally positioned on leads 101–116, except during certain time slots intended for testing operations in which suitable sequences of test bits present on connection 100 are transmitted to output leads 401–416.

A shift register SR is stepped by time base BT so as to load, every 64 $\mu$s, the 16 samples, each represented by one bit, which during this period are present on wires 401–416; register SR shifts these samples internally every 4 $\mu$s. The output of the first cell of register SR is the lead 151 connected to alarm network RA (FIG. 2); the same output lead and the output lead 152 of the second register cell are connected to a further register RE whose output is the line (7) and which is controlled by time base BT so as to load every 8 $\mu$s the two bits present on wires 151, 152. By this arrangement, if internal delays and propagation times of the various devices are neglected, as soon as register SR loads the 16 bits supplied by multiplexer MU, those located in the first two cells on the left are immediately present on output 7 of output register RE; after 8 $\mu$s, output 7 will carry the pair of bits which had been loaded in the third and fourth cells of register SR, and so on till the end of the group of 16 bits, and the same thing will occur for the subsequent groups of 16 bits.

The operation of the apparatus will now be described, first from a general viewpoint and then with particular reference to a trunk-dialed call involving one of the call monitors generating periodic counting pulses, e.g. call monitor $G_1$ (FIG. 1). When that call monitor is in its dialing phase, it may be sampled at the maximum scanning rate described above.

In the following description, reference will be made to a logic state "0" or "1" present on certain wires, state "0" representing the idle condition of a telephone line and the absence of metering pulses on the wires provided therefor.

On this basis, the general operation of the apparatus may be easily ascertained from the foregoing description of the diagrammatic drawing: all the connections $1a$–$1m$ of all the call monitors $G_1$–$G_n$ are cyclically scanned by the detectors SD in a predetermined sequence controlled by timing devices associated therewith.

At appropriate time intervals, the detectors SD send to serializer MS on their respective output 2A, 2B, ... 2M a sample, represented by a single bit, for each parameter affecting each call monitor. Such emission is controlled by the aforementioned timing devices synchronized with time base BT of unit ID. The synchronization can take place, for instance, by means of a signal whose phase varies with respect to the frame time; through a suitable geometrical arrangement of signal detectors SD I can ensure that, whatever may be the distance of these detectors from unit ID, the samples emitted by each of them arrive at serializer MS at predetermined instants.

Frame serializer MS extracts the various samples at a frequency depending on the nature of the parameter represented by the samples, and feeds out a frame of pairs of samples whose structure depends on the configuration of the imaginary matrix encompassing the sets of sensors.

The frame of samples issuing from serializer MS contains also, in suitable predetermined time slots, checking signals whose processing in alarm network RA allows the testing of both the correct operation of detecting devices SD and the quality of signal transmission over connections 2A–2M.

Such a test can be carried out, for instance, through analysis of parity checks associated with the samples emitted by each set of sensors and by memorizing, whenever a parity error is detected, a pre-alarm signal relating to the device causing the error. An alarm signal is generated only in the case of several successive errors occurring for any one device.

The pairs of samples issuing from serializer MS, the alarm signals coming from network RA and the possible asynchronous signals arriving via connection 17 from components other than call monitors $G_1$–$G_n$ are sequentially inserted by formatter FD (FIG. 2) into a comprehensive frame of words, each of them comprising—in addition to information bits including bits indicating the state of a device, alarm bits, or bits forming asynchronous signals—also bits of the present address scanned by time base BT.

These words are sent to preprocessor IP (FIG. 1) which, unless inhibited by signals arriving from discriminating network NE (FIG. 2) indicating that a particular time slot does not carry any useful information, recognizes status changes and carries out the time checks necessary for duration measurements.

The presence of the time-base address in each word fed to preprocessor IP allows microprocessor EL to determine the correct significance of the status changes and of the time checks detected on various wires of the preprocessor, and to correlate the information supplied by each status change or by each time check with those detected during other time intervals of the frame and pertaining to other parameters affecting the same call monitor.

Reference may be made to the aforementioned copending application Ser. No. 107,659 for a description of the way in which status changes, time checks and association of the detected information with corresponding call monitors are carried out.

Once the correspondence between the detected information and a certain circuit condition has been recognized, the microprocessor effects a number of processing operations on-line or off-line both for individual call monitors and for arbitrarily defined monitor groups, and also for the entirety of the call monitors associated with the exchange, so as to allow the utilization of the pulse counts for statistical investigations of the traffic, for supervisory operations of the exchange, for maintenance purposes or for a rational dimensioning and utilization of the installations, as well as for the possible sharing of the charging credits.

Both the pulse counts and data obtained by the processing operation can be recorded at predetermined times, for instance every 24 hours, or upon the request of service personnel, or in response to a particular asynchronous signal (e.g. a tariff-modification signal) via a medium designed to allow subsequent processing operations off-line.

Figure 5A:
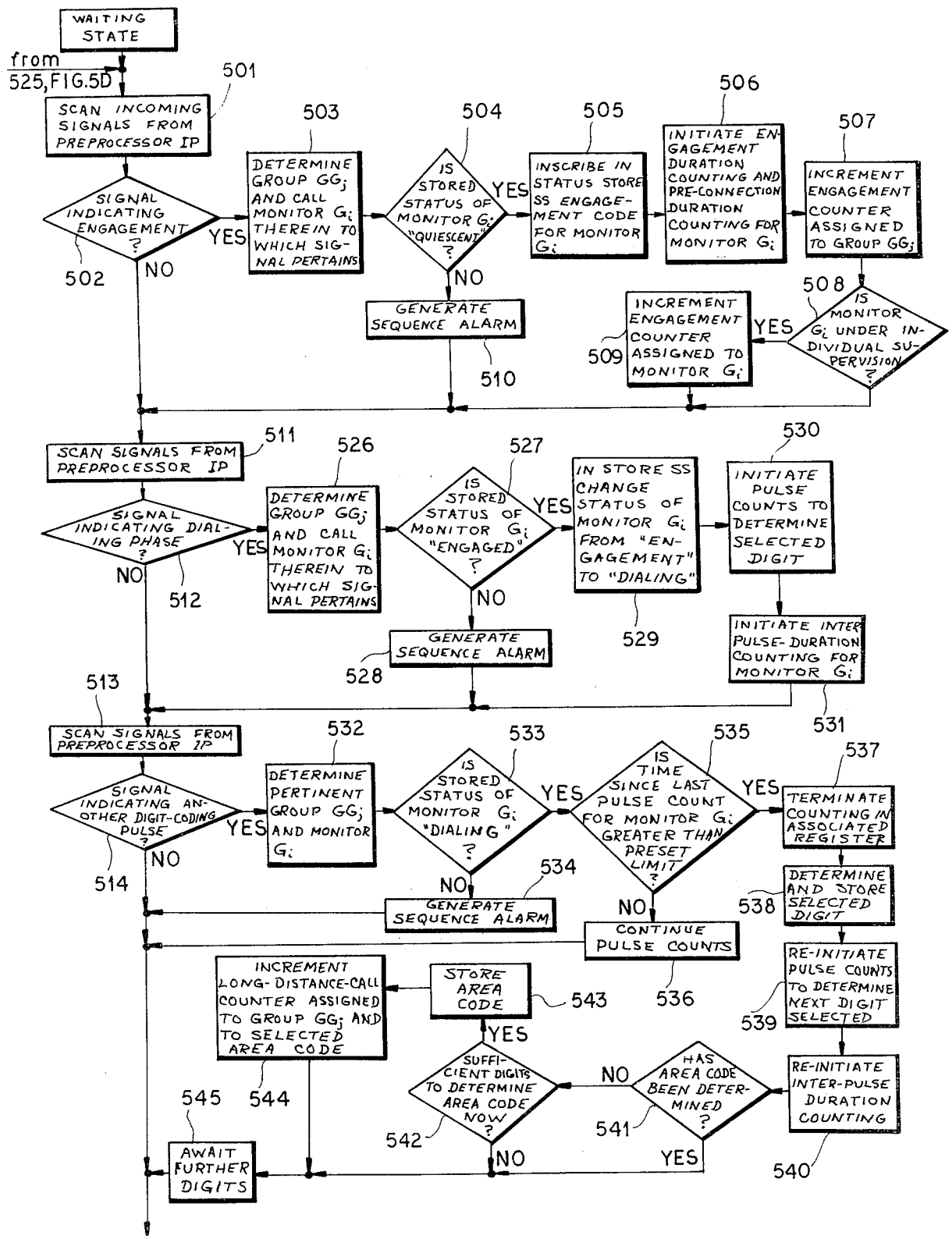
Figure 5B:
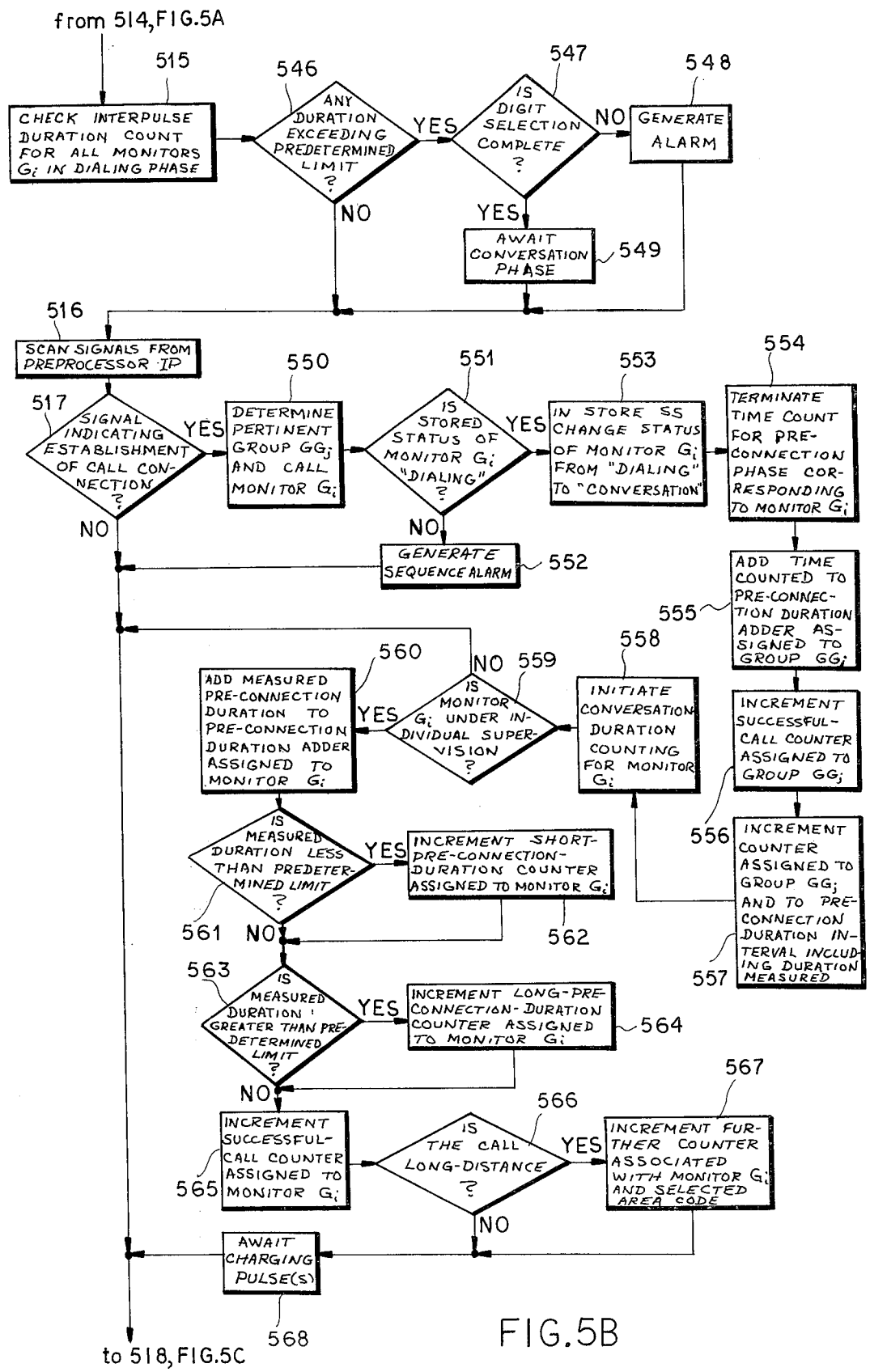
Figure 5C:
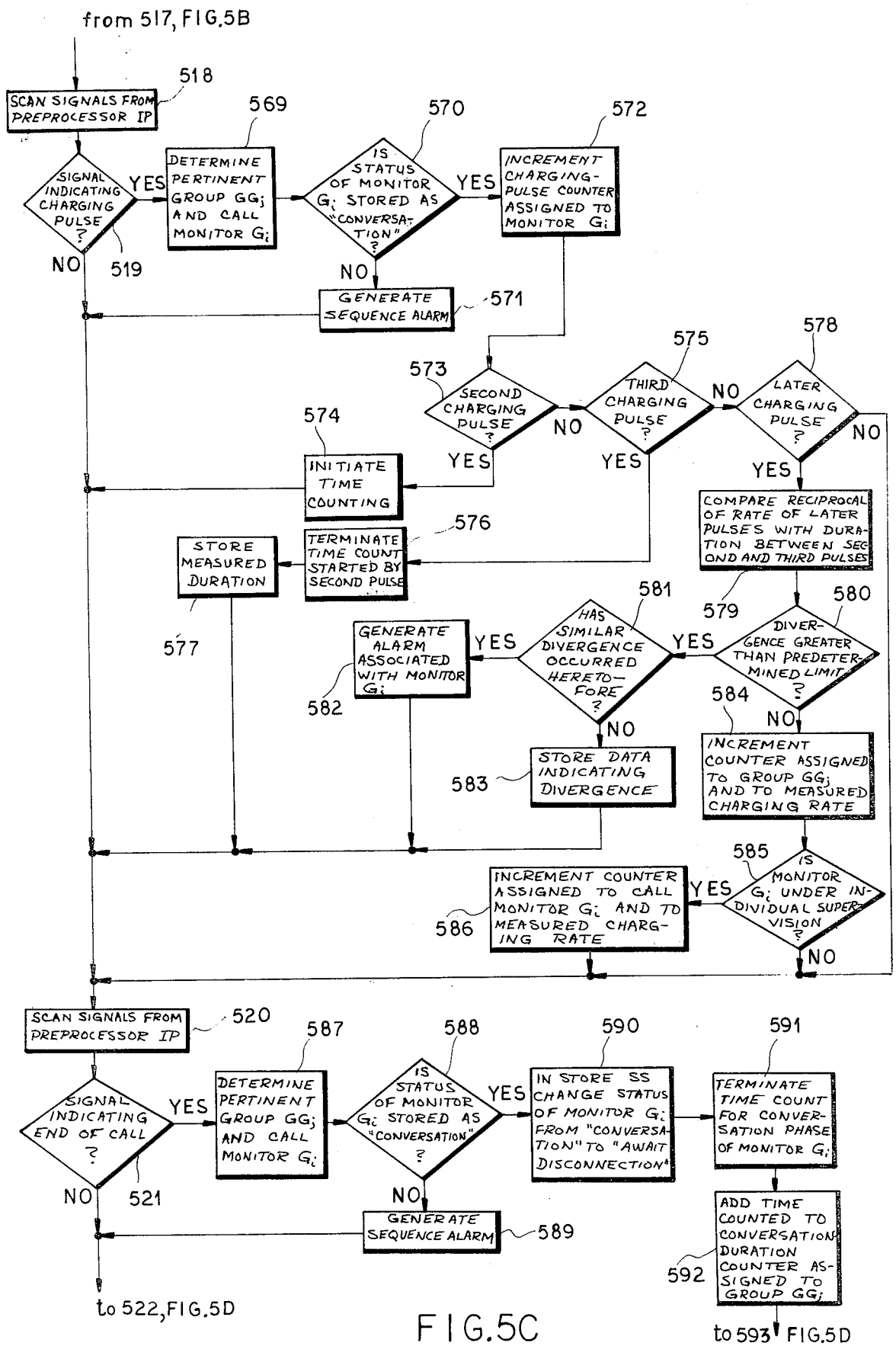

Let us now consider, with reference to FIGS. 5A–5D, a communication pertaining to a generic call monitor $G_i$, assumed to indicate a subscriber's successful trunk-dialed call. There will then be present on suitable output wires of this call monitor, for sequential examination, the engagement signal, the dial pulses, the call signal and the metering or charging pulses, these signals and pulses being detected by preprocessor IP, as described in application Ser. No. 107,659, and subsequently recognized by microprocessor EL at respective decision junctions 502 (FIG. 5A), 512 and 514 (FIG. 5A), 517 (FIG. 5B) and 519 (FIG. 5C).

A first processing operation consists in the simple summing of statistical data. For this purpose, call monitors $G_1$–$G_n$ may be subdivided into various groups, each of them associated with its own counter; this grouping is arbitrary and may be modified. It is also possible both to add up data relating to all the call monitors of the exchange and to provide data relating to a single call monitor.

When the sensor associated with the engagement wire of call monitor $G_i$ carries samples in such a sequence that preprocessor IP may recognize a transition from "0" to "1" on that wire, and upon a scan 501 (FIG. 5A) by microprocessor EL of an output buffer of the preprocessor, unit EL is enabled by the information relating to the occurred transition to associate that status change, at decision junction 502, with the engagement signal and, in an identification step 503, with call monitor $G_i$ on which the engagement signal has occurred. Microprocessor EL also determines in step 503 the group $GG_j$ or groups in which monitor $G_i$ has been classified.

Upon obtaining a positive result from a check 504 on the memorized status of monitor $G_i$, microprocessor EL will write into a corresponding area of memory ME (to be referred to as a status store SS) the information that call monitor $G_i$ is engaged (inscription step 505). At the same time, microprocessor EL starts a time check 506, in order to measure the engagement duration and a pre-connection interval terminating at the onset of the conversation phase, and increments by one unit in a step 507 a counter assigned to group $GG_j$ for storing the number of engagements of monitors in that group. The engagement counter may consist of a suitable area of the memory ME. If monitor $G_i$ is selected for individual supervision, as determined by microprocessor EL at a decision junction 508, an engagement counter assigned only to monitor $G_i$ will be incremented in a step 509. If the outcome of check 504 is negative, microprocessor EL generates at 510 an alarm indicating an error in sequence.

In the same way, microprocessor EL receives at junctions 512, 514 messages of status change from preprocessor IP on a wire it can identify with dialing signals from the same call monitor $G_i$.

During the dialing phase, in fact, a quick sequence of changeovers from "0" to "1" and vice versa will occur on this dialing wire. Microprocessor EL counts, for instance, leading edges of incoming pulses to recognize the dialed digit. Upon recognizing at junction 512 a first dialing pulse from monitor $G_i$, or a signal otherwise indicating the initiation of a dialing phase, microprocessor EL first identifies in a step 526 the group $GG_j$ and the call monitor $G_i$ therein to which the initiation signal pertains and then makes an inquiry 527 as to the stored status of the identified monitor. If the status of monitor $G_i$ is recorded as something other than "engaged", microprocessor EL generates a sequence alarm 528 and begins another scan 513 of the contents of an output buffer of preprocessor IP. If the stored status is "engaged", microprocessor EL updates at 529 the status store SS by writing in it that call monitor $G_i$ is in the dialing phase, initiates at 530 the counting of dialing pulses to determine the first selected digit, and starts at 531 a time check for recognizing the end of the digit.

If scan 513 discovers a signal indicating a further digit-coding pulse, unit EL determines the pertinent group $GG_j$ and monitor $G_i$ at an identification step 532 and then checks the previously stored status of monitor $G_i$ at an inquiry step 533. A negative outcome to inquiry 533 results in a sequence alarm 534, while a positive outcome leads to an inquiry 535 into whether all the pulses coding a selected digit have been received. If the time since the reception of the last digit-coding pulse, as measured by operations begun in step 531 or 540, does not exceed a predetermined limit, microprocessor EL proceeds to a check 515 of all the interpulse durations presently under measurement for monitors in the dialing phase. If, on the other hand, the time since the reception of the last digit-coding pulse from monitor $G_i$ does exceed the predetermined limit, the pulse-counting begun in step 530 is terminated in a step 537 and the consequently detected digit is stored in an area of memory ME (step 538). Microprocessor EL re-initiates at 539 the counting of pulses to determine the next selected digit and at 540 re-initiates interpulse-duration measurement. In a series of subsequent operations 541–544, the microprocessor investigates the distance of the pending call. Upon the detection of three or four initially dialed digits indicating a long-distance call, the selected area code is determined and stored (step 543) and the contents of a register or of a cell of memory ME are incremented (step 544), this register or cell being assigned to monitor group $GG_j$ for counting the number of calls from stations associated with monitors in group $GG_j$ to stations in the selected code area. If the area code has been previously determined, or if there are not yet sufficient digits to determine the area code, unit EL awaits further digits, as indicated at 545.

As heretofore described, microprocessor EL periodically undertakes a check 515 of the extant interpulse-duration countings. The detection at a decision junction 546 of a duration exceeding a predetermined maximum, equal to three or four times the threshold for distinguishing between pulses belonging to successive digits, induces an examination 547 of the corresponding set of selected digits. If the digit selection is incomplete, an alarm 548 is generated; otherwise, the microprocessor waits for the conversation phase, as indicated at 549.

This conversation phase is signaled by a new changeover from "0" to "1" which microprocessor EL, upon a scan 516 of the preprocessor's output, an inquiry 517 into the nature thereof and an identification operation 550, recognizes as pertaining to the call wire of monitor $G_i$. Unit EL generates a sequence alarm 552 if the stored status of monitor $G_i$ is found, upon a check 551 into the contents of status store SS, to be a phase other than "dialing". If, on the contrary, the stored status of monitor $G_i$ is "dialing", microprocessor EL updates again the status store (step 553), terminates time counting for the preconnection phase (step 554), adds the duration of the preconnection interval to the contents of a corresponding register or memory cell assigned to group $GG_j$ (step 555), increments a counter assigned to group $GG_j$ for storing the number of successful calls made from stations associated with monitors in this group (step 556), steps a further counter assigned to group $GG_j$ and to a set of preconnection durations including the one just determined (step 557), and initiates a new time check for measuring the call duration (step 558). An inquiry 559 is then made into whether monitor $G_i$ is under individual supervision. A negative answer to inquiry 559 causes microprocessor EL to scan (518) the output buffer of preprocessor IP for further call-related signals, while a positive answer results in an algebraic operation 560 adding the measured preconnection duration to a corresponding adder assigned to monitor $G_i$ alone. If the measured duration is less than a predetermined lower threshold, as determined at a decision junction 561, microprocessor EL increments in a step 562 a counter assigned to monitor $G_i$ for detecting a possible telephone station malfunction. If the measured duration exceeds an upper threshold, as checked by microprocessor EL at 563, a different counter is incremented in a step 564 for detecting another kind of failure. The contents of these counters are periodically read by microprocessor EL, e.g. during a stage 525 largely comprising statistical operations. Like the incrementing of the successful-call counter assigned to group $GG_j$, another successful-call counter assigned to monitor $G_i$ is stepped (at 565) if the same is under individual supervision. If the call is long-distance, as determined by unit EL at 566, the microprocessor advances in an arithmetic step 567 yet another counter assigned to monitor $G_i$ and to the selected area code. The microprocessor then awaits charging or metering pulses, as indicated at 568.

Upon the recognition at junction 519 (FIG. 5C) of a changeover "0" to "1" on a metering wire, microprocessor EL again identifies the pertinent group $GG_j$ and monitor $G_i$ (step 569) and executes a check 570 on the status relating to monitor $G_i$ and stored in memory ME. If the status of monitor $G_i$ is not registered as "conversation", a sequence alarm is produced in a step 571 leading to a further scanning step 520 of signals from preprocessor IP. Confirmation at junction 570 of conversation-phase status enables the incremental updating in a step 572 of a charging-pulse counter assigned to monitor $G_i$. It is, of course, understood that this counter may be formed as a cell of memory ME. If required, the microprocessor EL may order a time check implemented via decision junctions 573, 575 and operations 574, 576, 577 to measure the interval between the second and the third metering pulse; the knowledge of such interval enables a determination of the rate group and/or a verification of the correctness of the adopted metering cadence. For example, upon the reception of later charging pulses (at 578), the interval between the arrival of the second and the third charging pulse, or a number proportional to that interval, may be compared in a logic operation 579 with the reciprocal of the metering cadence. If the calculated divergence exceeds a predetermined maximum, as determined via an inquiry 580, and if a similarly large divergence has occurred before, as determined via another inquiry 581, an alarm associated with monitor $G_i$ may be energized (step 582); if a similarly large divergence has not occurred previously in the extant supervision period, microprocessor EL stores information on the detected disparity (step 583). Agreement between the two measurements related to charging rate results in the incrementing at 584 of the contents of a counter or memory cell assigned to group $GG_j$ and to the charging rate indicated by the metering cadence. Another counter similarly assigned to monitor $G_i$ and to the detected charging rate receives an incrementing pulse in a step 586, if monitor $G_i$ is found at a decision junction 585 to be under individual supervision. Metering data memorized at steps 572, 584, 586 are utilized by the microprocessor for subsequent processing operations for statistical purposes and exchange supervision.

Upon the recognition at 521 of a changeover from "1" to "0" on a call wire, the identification at 587 of the group $GG_j$ and the monitor $G_i$ therein associated with that wire, and the confirmation at 588 of the heretofore stored "conversation" status of monitor $G_i$, microprocessor EL updates at 590 the status of monitor $G_i$ in store SS to "await disconnection", terminates at 591 the duration measurement for the conversation phase of the call being monitored by device $G_i$, adds at 592 the measured duration to the contents of a register or memory assigned to group $GG_j$, and increments at 593 a counter assigned to group $GG_j$ and to a set of conversation durations including the connection time just determined. If the stored status of monitor $G_i$ is not found at 588 to be "conversation phase", a sequence alarm 589 is generated.

Upon the termination of the conversation phase of a call and upon the discovery at a decision junction 594 of the individual supervision of monitor $G_i$, the measured conversation duration is added in a step 595 to a conversation-duration register assigned to that monitor. If, in addition, the measured duration is found at a check point 596 to fall short of a predetermined minimum, microprocessor EL increments (step 597) a counter assigned to monitor $G_i$ for storing the number of calls having an unusually short conversation phase; if, on the other hand, the measured duration is found at a check point 598 to exceed a predetermined maximum, the microprocessor increments (step 599) a counter for keeping track of extraordinarily long conversation phases. Whether or not monitor $G_i$ is under individual supervision, microprocessor EL executes a check 600 to determine whether the terminated call is long-distance. If "YES", a total charge is calculated on the basis of the selected area code (step 601), the calculated charge being compared in a step 602 with the amount actually charged. If comparison 602 yields an inequality decided by microprocessor EL at 603, an alarm 604 is produced.

A processor scan 522 resulting in a recognition at junction 523 of a changeover "1" to "0" indicating disconnection leads to an identification step 605 for determining the pertinent group $GG_j$ and call monitor $G_i$ therein. A subsequent inquiry 606 into the status of monitor $G_i$ stored in memory area SS yields the generation of a sequence alarm 607 if the stored status is a coded phase other than "await disconnection". If the status of that monitor is correctly stored, microprocessor EL changes it in an inscription step 608 to "quiescent". The microprocessor then terminates at 609 the time check for the engagement phase monitored by device $G_i$, adds at 610 the time measured to the contents of the engagement-duration register or memory cell assigned to group $GG_j$, and increments at 611 the counter assigned to group $GG_j$ for counting the number of engagements having durations falling within a predetermined interval or set. At a subsequent junction 612, microprocessor EL again checks the supervision status of monitor $G_i$. If the monitor is individually supervised, the measured engagement duration is added in a step 613 to the contents of a register for storing the total engagement duration experienced by the station monitored by device $G_i$. If the measured duration is less than a minimum (junction 614), a short-engagement counter assigned to monitor $G_i$ is incremented (step 615), whereas if the measured engagement duration is greater than a maximum (junction 616), a long-engagement counter likewise assigned to that monitor is stepped (at 617).

Upon the implementation of operations related to disconnection, or if there are no disconnection signals communicated by preprocessor IP, microprocessor EL makes one or more checks 524 to determine whether it is time for a recurrent statistical processing operation. If not, unit EL returns to scan 501 (FIG. 5A); otherwise, the aforementioned stage 525 is activated.

Summing operations may be carried out at predetermined time periods (e.g. every 24 hours) by periodically resetting the counters, or without interruption; in this way, data are available concerning both general traffic situations associated with the exchange and the situation relating to a period just terminated.

Moreover, as event counters are brought up to date as soon as the event occurs, instantaneous traffic density may be determined; this information enables recognition or avoidance of possible congestion.

A further processing operation, which may be obtained from counting operations, may be the distribution of call durations. Upon an operator's request, data may be read relating to the number of call attempts (stored in step 507 or 509) and engagement duration (stored in step 610 or 613) within certain time periods; monitors having unduly long or unduly short engagements, possibly indicating operational failures, are determined by reading information stored in steps 615 and 617 (FIG. 5D).

For the various call monitors it is possible to detect the number of unsuccessful calls, but subtracting the counter contents advanced in step 565 from the contents incremented in step 509, or the number of calls not charged, by adding the contents of all the charging-rate counters assigned to monitor $G_i$ (step 586) and subtracting from the sum the contents of the associated engagement counter (step 509); the number of uncharged calls may denote malfunctions. To provide significant indications, these absolute data are referred both to the total number of engagements or calls of a given call monitor during a certain period and to analogous values of all the supervised call monitors, i.e. to a mean value; in case the deviation from the mean value exceeds a certain limit, an alarm signal is given.

In the same way all the anomalous conditions are signaled, as for instance the identity of call monitors which have never been involved in the traffic for a certain period, the presence of metering pulses for engagements not followed by conversation, or lack of correspondence between the sequence of the states of a call monitor and one of the possible circuit conditions.

Further performance characteristics are obtained through the analysis of dialing digits; in fact, the possibility of recognizing area codes allows a traffic sharing according to destination, and to this end additional counters can be provided which record data relating to the number and duration of engagements and calls, e.g. area by area.

The knowledge of destination, besides enabling statistical processing operations, facilitates also a check on the correctness of the adopted metering cadence by measuring the time elapsed between the second and the third metering pulse, as already mentioned; also in this case an alarm may be given upon detection of a certain number of pulse-rate errors.

The measurement of the time interval between the second and the third metering pulse allows the assignment of calls to different rate groups.

The embodiment described above may be modified in various ways. Thus, for instance, where reference has been made above to data reading from statistical counters associated with trunk calls, a modification of the program of microprocessor EL could allow the apparatus to carry out similar statistical counting and supervisory operations on units other than statistical counters, as for instance on first group selectors, on registers, or on incoming or outgoing transformers on which are present the same signals as are utilized in the described embodiment.

Besides, the circuitry and its mode of operation have been described with the assumption that the preprocessing interface is of the type disclosed in application Ser. No. 107,659 and that it operates on a pair of samples at a time.

In case the preprocessing interface IP is of the wired-logic type described in U.S. Pat. No. 4,220,824, the structure of the system is identical; it will be sufficient to add a further real-time signal generator associated with the bus of microprocessor EL in order to allow time checks for which no provision is made in that wired-logic interface.

I claim:

1. An apparatus for supervising the activities of numerous communication circuits of a telephone system as determined by respective call monitors, comprising:

a plurality of signal detectors each including a multiplicity of sensors forming groups connected to respective call monitors for receiving output signals therefrom which are indicative of the state of energization of the supervised circuits, said signal detectors emitting individual output frames sequentially combining a predetermined number of bits derived from samples of the output signals received by the respective sensors;

a data-input unit including serializing means connected to said signal detectors for receiving said individual output frames thereof and synthesizing therefrom a comprehensive frame with a constant number of time slots accommodating a multiple of said predetermined number of bits, said unit further including timing means for establishing a recurrent scanning cycle divided into several subcycles, said serializing means including switching means controlled by said timing means for selecting different combinations of output frames for assembly in said comprehensive frame during different subcycles, certain of said output frames derived from circuits in need of more frequent sampling being included in a plurality of subcycles periodically recurring within a scanning cycle; and processing means connected to said unit for receiving said comprehensive frame in each scanning cycle and evaluating the bits contained in respective time slots thereof.

2. An apparatus as defined in claim 1 wherein said switching means comprises a group of multiplexers with plural inputs connected to said signal detectors and with single outputs connected to respective cells of a shift register included in said unit, said shift register being steppable by said timing means a sufficient number of times during each subcycle to read out in said time slots all the signal samples contained in the output frames simultaneously fed in by way of said multiplexers, each of said multiplexers occupying a given position during a whole number of subcycles.

3. An apparatus as defined in claim 2 wherein said switching means further comprises an instruction memory addressable by said timing means for reading out the respective positions of said multiplexers during each subcycle.

4. An apparatus as defined in claim 3 wherein said switching means further comprises a store of selection codes loadable by said processing means for establishing a different scanning mode, said multiplexers being provided with switching inputs alternatively connectable to said memory and to said store.

5. An apparatus as defined in claim 2, 3 or 4 wherein said switching means includes a further multiplexer controlled by said timing means and inserted between said single outputs and said cells for connecting the latter to a source of test signals during certain of said time slots.

6. An apparatus as defined in claim 2, 3 or 4 wherein said switching means further includes an output register connected to a pair of adjacent cells of said shift register for simultaneously reading out the contents thereof to said processing means as part of said comprehensive frame.

7. An apparatus as defined in claim 3 or 4 wherein said unit further includes an alarm network with input connections to said timing means, to said memory and to a cell of said shift register for ascertaining position anomalies and thereupon inserting a malfunction indication in an available time slot of said comprehensive frame.

8. An apparatus as defined in claim 3 or 4 wherein said unit further includes a discriminating network with input connections to said timing means and to said memory for transmitting inhibiting signals to said processing means at instants coinciding with time slots allotted to nonexisting sensors.

9. An apparatus as defined in claim 3 or 4 wherein said memory is of the read-only type and contains switching codes for selectively connecting a given input of any of said multiplexers to the single output thereof at cadences which are equal to the recurrence rate of said scanning cycle multiplied by different integers.

10. An apparatus as defined in claim 1, 2, 3 or 4 wherein said processing means comprises a preprocessor and a microprocessor sharing a common data memory.

* * * * *